United States Patent [19]

Greene

[11] Patent Number: 4,609,987
[45] Date of Patent: Sep. 2, 1986

[54] AIRCRAFT GUIDANCE SYSTEM FOR TAKE OFF OR GO-AROUND DURING SEVERE WIND SHEAR

[75] Inventor: Leonard M. Greene, White Plains, N.Y.

[73] Assignee: Safe Flight Instrument Corporation, White Plains, N.Y.

[21] Appl. No.: 473,594

[22] Filed: Mar. 9, 1983

[51] Int. Cl.⁴ .................................................. G05D 1/08
[52] U.S. Cl. ..................................... 364/433; 364/434; 364/427; 244/181; 244/182; 73/178 T
[58] Field of Search ............... 364/427, 428, 433, 434, 364/440; 244/180–182, 188, 191; 73/178 R, 178 T; 340/968–970

[56] References Cited

U.S. PATENT DOCUMENTS

| 3,892,374 | 7/1975 | Lambregts | 244/182 |
| 3,955,071 | 5/1976 | Lambregts | 73/178 R |
| 3,981,442 | 9/1976 | Smith | 244/182 |
| 4,189,118 | 2/1980 | Peter-Contesse et al. | 244/182 |
| 4,189,119 | 2/1980 | Peter-Contesse et al. | 244/182 |
| 4,212,444 | 7/1980 | Stephan | 244/182 |
| 4,319,219 | 3/1982 | Rein-Weston | 73/178 T |
| 4,347,572 | 8/1982 | Berwick, Jr. et al. | 244/182 |
| 4,422,147 | 12/1983 | Hanke | 364/440 |

Primary Examiner—Gary Chin
Attorney, Agent, or Firm—Edward A. Sokolski

[57] ABSTRACT

A system which provides an increased minimum aircraft pitch attitude during take-off or go-around operations in the event that an unsafe wind shear condition is encountered. A control signal from a wind shear warning system, indicative of a dangerous wind shear condition, is fed to a switching device which controls the velocity command signal to the flight director pitch control. This switching device, in response to the wind shear signal, changes the velocity command to a lower predetermined value, such that the attitude of the aircraft is automatically increased to handle the wind shear encounter.

7 Claims, 1 Drawing Figure

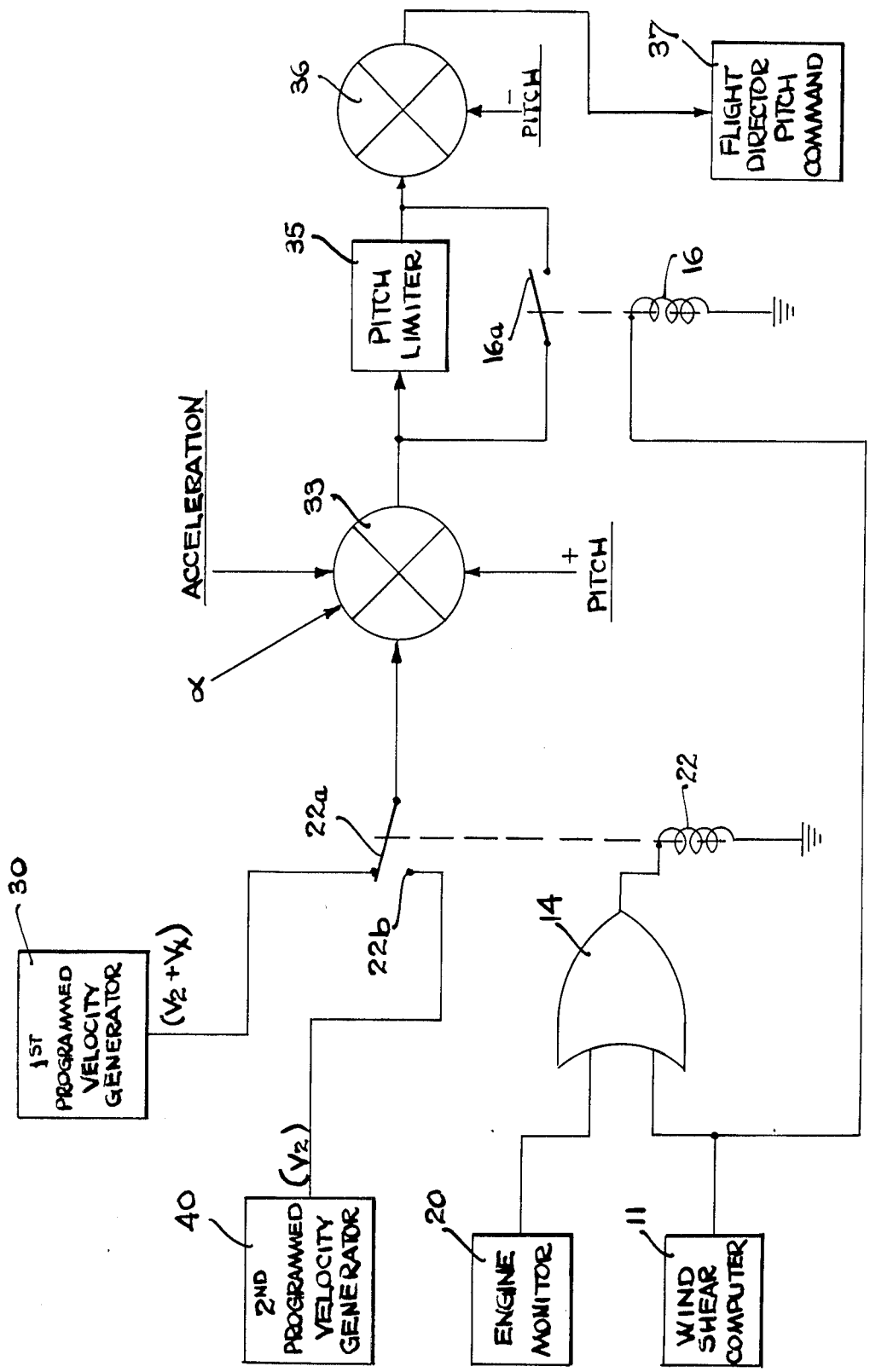

AIRCRAFT GUIDANCE SYSTEM FOR TAKE OFF OR GO-AROUND DURING SEVERE WIND SHEAR

This invention relates to aircraft flight control systems, and more particularly to such a system which provides a guidance signal during aircraft take-off or go-around in situations where severe wind shear is encountered.

In the take-off of an aircraft, severe wind shear conditions pose a significant hazard. If an advance warning is given as such condition is first being encountered, it is possible to increase the pitch attitude of the aircraft to offset the effects of this condition. Typically, the wind shear provides the greatest hazard when the aircraft is ascending at altitudes between 50 and 300 feet above the ground level, such that the increased aircraft pitch angle is most needed at this time.

In my U.S. Pat. No. 4,079,905, a system is described for providing an indication of dangerous wind shear conditions, this system providing a warning signal to the pilot, as well as a signal for providing automatic control of the throttle controls to increase thrust. The system of the present invention makes use of this same wind shear warning signal to control a pitch command system during take-off and go-around so as to fly a safe aircraft pitch attitude in view of the wind shear encountered, this end result being implemented in the pitch command control circuits of the aircraft flight control system.

It is therefore an object of this invention to lessen the hazards of wind shear conditions encountered during take-off and go-around of an aircraft.

It is a further object of this invention to provide means for modifying the automatic flight control system of an aircraft to provide a safe pitch attitude when severe wind shear conditions are encountered during take-off and go-around.

Other objects of this invention will become apparent as the description proceeds in connection with the accompanying drawings of which:

The sole FIGURE is a schematic drawing illustrating a preferred embodiment of the invention.

Briefly described, the system of the present invention provides a switch-over device which may take the form of a relay to change the programmed aircraft velocity (airspeed) signal from a first value to a second value in the event that severe wind shear conditions are encountered. At the same time previous limits placed on pitch attitude of the aircraft are eliminated in response to this same wind shear signal.

Referring now to the drawing, a signal indicating a dangerous wind shear condition is fed from wind shear computer 11 to OR gate 14. Wind shear computer 11 may comprise a system such as described in my U.S. Pat. No. 4,079,905, where the signal fed to OR gate 14 is the signal fed to the warning device of such a system, which represents a dangerous wind shear condition. This same output of wind shear computer 11 is also fed to relay 16 and actuates this relay to close the contact arm 16a thereof.

Engine monitor 20 provides a signal to OR gate 14 in the event that there should be a loss of power in one or more of the engines of the aircraft. The output of OR gate 14 is fed to relay 22. Thus, when there is either a dangerous wind shear condition, as indicated by an output from wind shear computer 11, or an engine failure, as indicated by an output from engine monitor 20, a signal is fed through OR gate 14 to actuate relay 22, connecting the contact arm 22a thereof to terminal 22b.

First programmed velocity generator 30, engine monitor 20, summing device 33 and the means for generating the angle of attack ($\alpha$), acceleration and pitch inputs to this summing device, as well as pitch limiter 35 and flight director pitch command 37, are all parts of a speed command automatic throttle system such as the SCAT (speed command of attitude and thrust) system commercially available from Safe Flight Instrument Corporation, White Plains, N.Y. Such a system is also described in U.S. Pat. Nos. 2,945,375 and 3,486,722, assigned to said Safe Flight Instrument Corporation.

Under normal take-off and go-around conditions, i.e., in the absence of a measured engine failure or a dangerous wind shear condition, switch contacts 22a and 16a are in the "opened" position, as shown in the figure. Under such conditions, summing device 33, in addition to receiving the acceleration, pitch, and angle of attack ($\alpha$) inputs, receives a signal ($V_2+V_x$) fed through switch 22a from first programmed velocity generator 30. This signal represents a minimum safety air speed ($V_2$), plus an additional safety factor signal ($V_x$) which may be of the order of 10 knots.

In a typical system, the signal ($V_2+V_x$) represents the velocity command needed to assure safe take-off for an all engines operating situation. The programmed velocity (airspeed) signal ($V_2+V_x$) is summed with the angle of attack ($\alpha$), acceleration and pitch signals in summing device 33 to provide an output to pitch limiter 35 which represents a pitch command for the aircraft for a safe take-off and go-around. This pitch signal is limited to a predetermined maximum value, generally of the order of 15°, by means of pitch limiter 35. The output of pitch limiter 35 is fed to summing device 36 which also receives a signal in accordance with the pitch signal in a negative polarity (i.e., for subtraction from the output of the pitch limiter). Thus, so long as the predetermined pitch limit is not exceeded, the positive and negative pitch signals cancel each other out. The output of summing device 36 is fed to flight director pitch command 37 which controls the pitch of the aircraft.

In the event that a dangerous wind shear condition is encountered or should there be a failure in one of the engines, a signal is provided through OR gate 14 to actuate relay 22 to bring relay contact arm 22a in contact with terminal 22b. In the event of a dangerous wind shear condition, the output of wind shear computer 11 also operates to actuate relay 16 to close relay contact 16a. When this occurs the output ($V_2$) of second programmed velocity generator 40 is fed to summing device 33, $V_2$, representing the programmed minimum speed for safety (without the added overspeed, $V_x$, normally employed). This signal is summed, as in the case of the first programmed velocity, with the angle of attack ($\alpha$) acceleration, and pitch signals in summing device 33. The pitch limiter 35 is eliminated from the circuit by the closing of contact 16a, such that a greater pitch angle is permitted which typically is of the order of 18°. This pitch control signal is fed to the flight director pitch command 37 to automatically provide the increased pitch attitude needed to handle the emergency situation.

While the invention has been described and illustrated in detail, it is to be clearly understood that this is intended by way of illustration and example only and is not to be taken by way of limitation, the spirit and scope of the invention being limited only by the terms of the following claims.

I claim:

1. In a system for controlling the pitch of an aircraft during take-off and go-around operations, said system including means for controlling the pitch of the aircraft in response to a first predetermined programmed minimum airspeed signal ($V_2+V_x$) wherein $V_2$ is a second predetermined programmed airspeed signal and $V_x$ is a safety factor, and in accordance with signals representing the measured angle of attack ($\alpha$), acceleration and pitch of the aircraft, and further including means for limiting the pitch of the aircraft to a predetermined maximum value, the improvement comprising:

means for automatically substituting said second predetermined programmed airspeed signal ($V_2$) for said first programmed minimum airspeed signal ($V_2+V_x$) in response to the signal representing an unsafe wind shear condition, and means for substituting a pitch control signal in accordance with said second predetermined programmed airspeed signal ($V_2$) for the output of the means for limiting the pitch of the aircraft, in response to said signal representing the unsafe wind shear condition, whereby the pitch attitude of the aircraft can be automatically increased above the predetermined maximum value to enable the aircraft to safely handle said wind shear condition.

2. The system of claim 1 and additionally including engine monitor means for providing an output signal in the event of an engine failure, said output signal being fed to actuate the means for substituting the second programmed airspeed signal for the first programmed airspeed signal in the event of said engine failure.

3. The system of claim 1 wherein the means for substituting the signal representing the second programmed airspeed for the signal representing the first programmed airspeed and the means for substituting the pitch control signal comprise relays actuated by said signal indicating the existence of an unsafe wind shear condition.

4. The system of claim 1 or 2 for generating said signal representing the existence of said unsafe wind shear condition.

5. The system of claim 1 or 2 wherein the second programmed airspeed signal ($V_2$) represents the minimum programmed airspeed for safe take-off of the aircraft in the event one of the engines should fail.

6. The system of claim 1 or 2 wherein said safety factor, $V_x$, is of the order of 10 knots.

7. The system of claim 1 wherein the pitch attitude of the aircraft is automatically increased in response to said signal representing an unsafe wind shear condition to approximately 18 degrees.

* * * * *